(12) United States Patent
Delich

(10) Patent No.: US 6,400,092 B1
(45) Date of Patent: Jun. 4, 2002

(54) APPARATUS FOR DRIVING AN ELECTRO-LUMINESCENT DEVICE

(75) Inventor: Philip Delich, Jane Brook (AU)

(73) Assignee: Lumitex Pty Ltd., South Perth (AU)

( * ) Notice: Subject to any disclaimer, the term of this patent is extended or adjusted under 35 U.S.C. 154(b) by 0 days.

(21) Appl. No.: 09/424,942

(22) PCT Filed: Jun. 5, 1998

(86) PCT No.: PCT/AU98/00426

§ 371 (c)(1),
(2), (4) Date: Feb. 15, 2000

(87) PCT Pub. No.: WO98/56212

PCT Pub. Date: Dec. 10, 1998

(30) Foreign Application Priority Data

Jun. 5, 1997 (AU) .............................................. P07215

(51) Int. Cl.[7] .................................................. G09G 3/10
(52) U.S. Cl. ..................................... 315/169.3; 315/360
(58) Field of Search .......................... 315/169.3, 169.1, 315/141, 209 R, 276, 278, 283, 291, 307, 360

(56) References Cited

U.S. PATENT DOCUMENTS

| 4,595,861 A | * | 6/1986 | Simopoulos et al. | .... 315/169.3 |
|---|---|---|---|---|
| 5,293,098 A | * | 3/1994 | Brownell | ................. 315/209 R |
| 5,565,739 A | * | 10/1996 | Brownell | .................. 315/169.3 |
| 5,576,601 A | * | 11/1996 | Koenck et al. | .............. 315/291 |
| 5,712,533 A | * | 1/1998 | Corti | ........................... 315/307 |
| 6,043,609 A | * | 3/2000 | George et al. | ............ 315/169.3 |

\* cited by examiner

*Primary Examiner*—Don Wong
*Assistant Examiner*—Thuy Vinh Tran
(74) *Attorney, Agent, or Firm*—Dougherty & Clements LLP

(57) ABSTRACT

An apparatus (10) for driving an electro-luminescent device (12), characterized by: a transformer (14) including a ferrite core (72) and a first primary winding (66), a second primary winding (68) and a secondary winding (70) wound onto said core (72) without an air gap; one end of each of the first and second primary windings (66, 68) being connected together; an electrical circuit arranged to drive said one ends of the first and second primary windings (66, 68); a feed back circuit connected between the electrical circuit and the other end of the second primary winding (68) to control operation of said electrical circuit; one end of the secondary winding (70) being connected to said other end of the second primary winding (68); and the other end of the secondary winding (70) being connected to the electro-luminescent device (12).

12 Claims, 1 Drawing Sheet

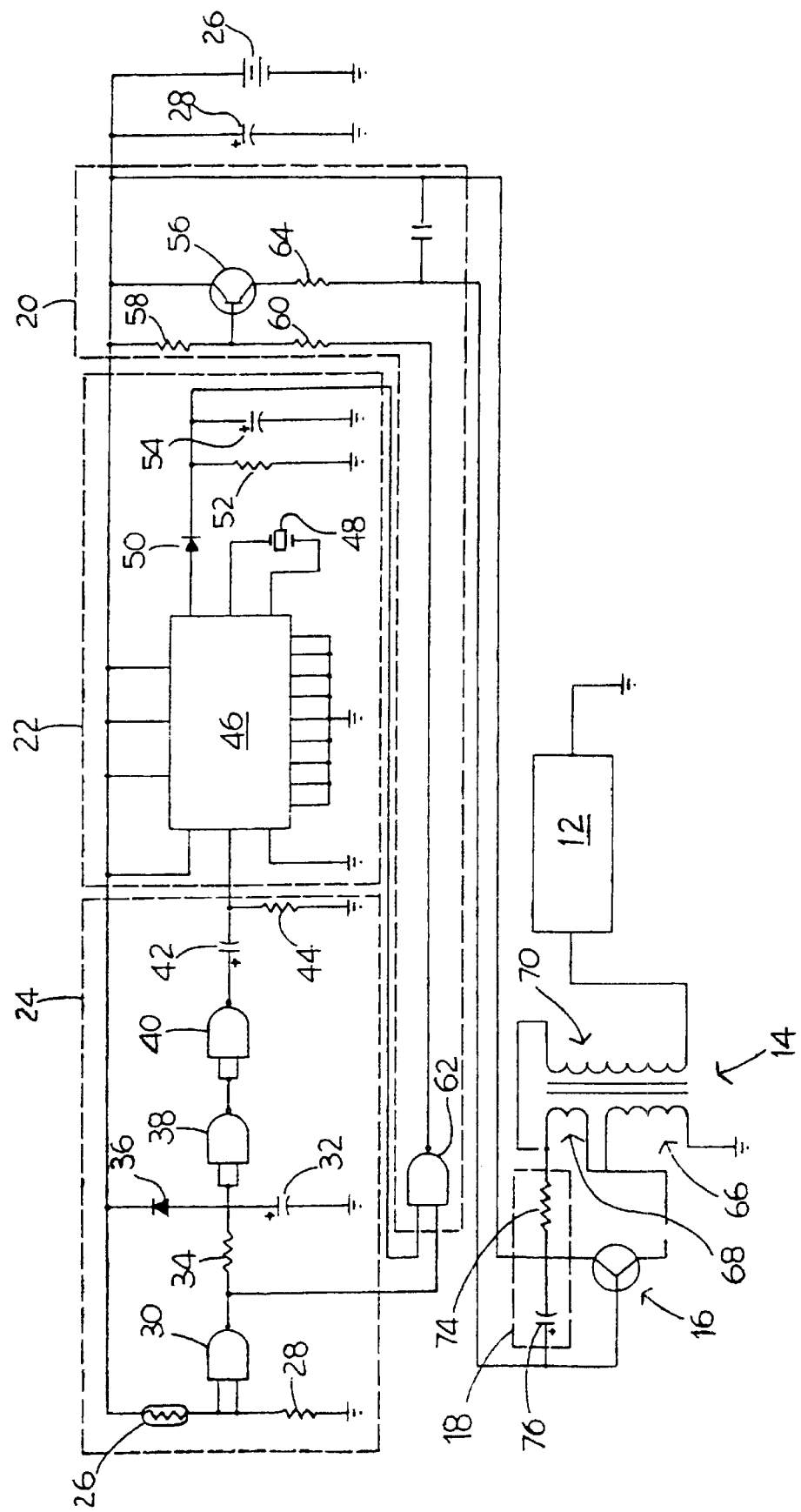

APPARATUS FOR DRIVING AN ELECTRO-LUMINESCENT DEVICE

FIELD OF THE INVENTION

The present invention relates to an apparatus for driving an electro-luminescent device.

DISCUSSION OF THE PRIOR ART

Electro-luminescent sheets are used in a variety of applications, including signs and house numbers. Electro-luminescent sheets typically comprise a conductive substance sandwiched between two conductive plates. The conductive substance becomes luminescent in the presence of an electric field, so that by applying a voltage across the two conductive plates, the conductive substance emits light.

Electro-luminescent sheets currently available require an AC voltage to be applied to the conductive plates in order to achieve luminescence. Inefficiencies in existing DC-AC inverter circuits have limited the use of electro-luminescent sheets where only battery power is available.

Typically, an electro-luminescent sheet requires 40–80 volts, depending upon the brightness required. Existing DC-AC inverter designs consume approximately 80 milli-amps or more to achieve the required AC voltage.

Throughout this specification, unless the context requires otherwise, the word "comprise" or variations thereof, will be understood to imply the inclusion of a stated integer or group of integers but not the exclusion of any other integer or group of integers.

BRIEF DESCRIPTION OF THE INVENTION

According to one aspect of this invention, there is provided an apparatus for driving an electro-luminescent device, characterized by: a transformer including a ferrite core and a first primary winding, a second primary winding and a secondary winding wound onto said core without an air gap; one end of each of the first and second primary windings being connected together; an electrical circuit arranged to drive said one ends of the first and second primary windings; a feed back circuit connected between the electrical circuit and the other end of the second primary winding to control operation of said electrical circuit; one end of the secondary winding being connected to said other end of the second primary winding; and the other end of the secondary winding being connected to the electro-luminescent device.

Preferably, the electrical circuit includes a transistor,

Preferably, the feed Pack circuit comprises a resistor and a capacitor provided in series between said other end of the secondary primary winding and the base of the transistor.

Preferably, the resistor and the capacitor are arranged such that the transistor produces an oscillating output having a frequency less than 200 Hz.

Preferably, the apparatus includes a timing circuit arranged to deactivate said electrical circuit after a predetermined time period.

Preferably, the apparatus further includes a light sensing circuit arranged such that said electrical circuit is deactivated in the presence of daylight or other strong light sources.

Preferably, the turns ratio between the first and second primary windings is between 1:14 and 1:12. More preferably, the turns ratio between the first and second primary windings is 1:13⅓.

Preferably, the second primary winding has 16.5 turns.

Preferably, the turns ratio between the second primary winding and secondary winding is between 1:100 and 1:250. More preferably; the turns ratio between the second primary winding and the secondary winding is between 1:175 and 1:185. Still more preferably, the turns ratio between the second primary winding and the secondary winding is between 1:181 and 1:182.

Preferably, the secondary primary winding is wound onto said core first, then said second primary winding and finally said first primary winding.

According to a second aspect of the present invention, there is provided an electro-luminescent device, characterized in that said device comprises at least in part a driver apparatus, said driver apparatus in turn comprising: a transformer including a ferrite core and a first primary winding, a second primary winding and a secondary winding wound onto said core without an air gap; one end of each of the first and second primary windings being connected together; an electrical circuit arranged to drive said one ends of the first and second primary windings; a feed back circuit connected between the electrical circuit and the other end of the second primary winding to control operation of said electrical circuit, one end of the secondary winding being connected to said other end of the second primary winding; and the other end of the secondary winding being connected to the electro-luminescent device.

According to a further aspect of this invention, there is provided an apparatus for driving an electro-luminescent device, characterised by: a transformer, an electrical circuit arranged to drive the transformer; a feed back circuit connected between the electrical circuit and the transformer to control operation of said electrical circuit; a light sensing circuit; and a timing circuit arranged to deactivate said electrical circuit after a predetermined time period.

Preferably, the light sensing circuit comprises at least in part a light dependent resistor and a resistor arranged to provide bias voltage to a NAND gate. The light dependent resistor and the resistor bias both inputs of the NAND gate where NAND gate acts as an inverter. Still preferably, the light dependent resistor and the resistor are arranged such that in the presence of strong light the output of the NAND gate will be low and in darkness the output of the NAND gate will be high.

The output of the NAND gate charges or discharges a capacitor via a resistor. A diode is connected between the capacitor and the positive voltage rail to clamp the voltage across the capacitor. The capacitor, the resistor and the diode form a damping circuit for the output of the NAND gate.

A NAND gate is connected to the capacitor. The output of the NAND gate acts as an input to a NAND gate. A capacitor and a resistor are connected to the output of the NAND gate to form a high-pass filter. The voltage across the resistor is output to the timing circuit.

The capacitor and the resistor are chosen such that the output of the NAND gate must be high for 4 minutes before the voltage across the capacitor is sufficient to trigger the NAND gate. This is desirable to prevent temporarily bright lights, such as those from passing vehicles, re-triggering the timing circuit. The capacitor and the resistor act to provide a pulse signal to the timing circuit.

The timing circuit comprises an integrated timing circuit, a crystal, a diode, a resistor and a capacitor. The integrated timing circuit is connected to the resistor and receives the pulse signal therefrom. The crystal is connected to the integrated timing circuit to provide a stable frequency source. The integrated timing circuit is arranged to provide a pulse output for 7 hours after being triggered. The diode, the resistor and the capacitor act as a smoothing circuit such that whilst the integrated timing circuit is providing a pulse output, the voltage across the capacitor is high.

The control circuit comprises a transistor biased by resistors and connected between the position voltage rail and the output of a NAND gate such that the transistor will be switched on only when the output of the NAND gate is low. The collector of the resistor is connected to the base of the transistor via a resistor.

One of the inputs of the NAND gate is connected to the output of the NAND gate and the other input of the NAND gate is connected to the capacitor. Since both inputs must be high in order that the output of the NAND gate be low, and consequently the transistor be switched on, power will not be supplied to the electro-luminescent sheet unless the timing circuit is active and light is not sensed by the light dependant resistor

DESCRIPTION OF THE DRAWINGS

One embodiment of this invention will now be described with reference to the accompanying drawing, in which:

FIG. 1 is a schematic circuit diagram of an apparatus according to the first embodiment.

DESCRIPTION

The first embodiment is directed towards an apparatus 10 for driving an electro-luminescent sheet 12.

The apparatus 10 comprises a transformer 14, a transistor 16, a feed back circuit 18, a control circuit 20, a timing circuit 22 and a light sensing circuit 24. The apparatus also includes a power supply in the form of a battery 26 and a capacitor 28.

The light-sensing circuit 24 includes a light dependent resistor 26 and a resistor 28 arranged to provide bias voltage to a NAND gate 30. The light dependent resistor 26 and the resistor 28 bias both inputs of the NAND gate 30, such that the NAND gate 30 acts as an inverter The light dependent resistor 26 and the resistor 28 are arranged such that in the presence of strong light, such as sunlight, the output of the NAND gate 30 will be low and in darkness the output of the NAND gate 30 will be high.

The output of the NAND gate 30 charges or discharges a capacitor 32 via a resistor 34. A diode 36 is connected between the capacitor 32 and the positive voltage rail to clamp the voltage across the capacitor 32. The capacitor 32, the resistor 34 and the diode 36 form a damping circuit for the output of the NAND gate 30.

A NAND gate 38 is connected to the capacitor 32. The output of the NAND gate 38 acts as an input to a NAND gate 40. A capacitor 42 and a resistor 44 are connected to the output of the NAND gate 40 to form a high-pass filter. The voltage across the resistor 44 is output to the timing circuit 22.

The capacitor 32 and the resistor 34 are chosen such that the output of the NAND gate 30 must be high for 4 minutes before the voltage across the capacitor 32 is sufficient to trigger the NAND gate 38. This is desirable to prevent temporarily bright lights, such as those from passing vehicles, re-triggering the timing circuit 22. The capacitor 42 and the resistor 44 act to provide a pulse signal to the timing circuit 22.

The timing circuit 22 comprises an integrated timing circuit 46, a crystal 48, a diode 50, a resistor 52 and a capacitor 54. The integrated timing circuit 46 is connected to the resistor 44 and receives the pulse signal therefrom. The crystal 48 is connected to the integrated timing circuit 46 to provide a stable frequency source. The integrated timing circuit 46 is arranged to provide a pulse output for about 7 hours after being triggered. The diode 50, the resistor 52 and the capacitor 54 act as a smoothing circuit such that whilst the integrated timing circuit 46 is providing a pulse output, the voltage across the capacitor 54 is high.

The control circuit 20 comprises a transistor 56 biased by resistors 58 and 60 connected between the position voltage rail and the output of a NAND gate 62 such that the transistor 56 will be switched on only when the output of the NAND gate 62 is low. The collector of the resistor 56 is connected to the base of the transistor 16 via a resistor 64.

One of the inputs of the NAND gate 62 is connected to the output of the NAND gate 30 and the other input of the NAND gate 62 is connected to the capacitor 54. Since both inputs must be high in order that the output of the NAND gate 62 be low, and consequently the transistor 56 be switched on, power will not be supplied to the electro-luminescent sheet 12 unless the timing circuit 22 is active and light is not sensed by the light dependent resistor 26.

The transformer 14 comprises a first primary winding 66, a second primary winding 68 and a secondary winding 70 wound onto a ferrite core 72 without an air gap. The secondary winding 70 consists of 3000 turns which are wound onto the ferrite core 72 first. Next, the second primary winding 68 which comprises 16.5 turns is wound onto the ferrite core 72. Finally, the first primary winding 66 which comprises 220 turns is wound onto the ferrite core 72. One end of the first and second primary winding 66 and 68 are connected together and to the emitter of the transistor 16. The other and of the first primary winding 66 is connected to ground. The other end of the second primary winding 68 is connected to one end of the secondary winding 70. The other end of the secondary winding 70 is connected to the electro-luminescent sheet 12.

The feed back circuit 18 extends between the other end of the second primary winding 68 in the base of the transistor 16. The feed back circuit 18 comprises a resistor 74 and a capacitor 76 provided in electrical series, The feed back circuit 18 ensures the transistor 16 oscillates on and off, with the values of the resistor 74 and the capacitor 76 chosen such that the frequency of oscillation is 152 Hz with a battery 26 of 3 volts.

The circuit shown in FIG. 1 produces a voltage of 37–40 AC across the electro-luminescent sheet 12, which is sufficient to ruminate approximately 100 square centimeters of the sheet 12.

It should be appreciated that this invention is not limited to the particular embodiment described above.

For example, the apparatus could be powered by sources other than batteries, such as solar panels or mains power. Where mains power is available, the timing circuit may be omitted. Further, a combination of power sources, such as a solar panel with a battery, or mains power with a battery back up could be utilized.

What is claimed is:

1. An apparatus for driving an electro-luminescent device, characterized by: a transformer including a ferrite core and a first primary winding, a second primary winding and a secondary winding wound onto said core without an air gap; one end of each of the first and second primary windings being connected together; an electrical circuit arranged to drive said one ends of the first and second primary windings;

a feed back circuit connected between the electrical circuit and the other end of the second primary winding to control operation of said electrical circuit; one end of the secondary winding being connected to said other end of the second primary winding; and the other end of the secondary winding being connected to the electro-luminescent device, wherein the secondary primary winding is wound onto said core first, then said second primary winding and finally said first primary winding, the turns ratio between the first and second primary windings being from 1:14 to 1:12, the turns ratio between the second primary winding and secondary winding being from 1:100 to 1:250; and wherein said electrical circuit includes a transistor and said feed back circuit comprises a resistor and a capacitor provided in series between said other end of the second primary winding and the base of the transistor.

2. An apparatus according to claim 1, wherein the resistor and the capacitor are arranged such that transistor produces an oscillating output having a frequency less than 200 Hz.

3. An apparatus according to claim 1, wherein the apparatus includes a timing circuit arranged to deactivate said electrical circuit after a predetermined time period.

4. An apparatus according to claim 1, wherein the apparatus further includes a light sensing circuit arranged such that said electrical circuit is deactivated in the presence of daylight or other strong light sources.

5. An apparatus for driving an electro-luminescent device, characterized by: a transformer including a ferrite core and a first primary winding, a second primary winding and a secondary winding wound onto said core without an air gap; one end of each of the first and second primary windings being connected together; an electrical circuit arranged to drive said one ends of the first and second primary windings; a feed back circuit connected between the electrical circuit and the other end of the second primary winding to control operation of said electrical circuit; one end of the secondary winding being connected to said other end of the second primary winding; the other end of the secondary winding being connected to the electro-luminescent device; and a timing circuit arranged to deactivate said electrical circuit after a predetermined time period, wherein the secondary primary winding is wound onto said core first, then said second primary winding and finally said first primary winding, the turns ratio between the first and second primary windings being from 1:14 to 1:12, and the turns ratio between the second primary winding and secondary winding being from 1:100 to 1:250.

6. An apparatus according to claim 5, wherein the light sensing circuit comprises at least in part a light dependent resistor and a resistor arranged to provide bias voltage to a NAND gate, the light dependent resistor and the resistor biassing both inputs of the NAND gate such that the NAND gate acts as an inverter.

7. An apparatus according to claim 6, characterized in that the light dependent resistor and the resistor are arranged such that in the presence of strong light the output of the NAND gate will be low and in darkness the output of the NAND gate will be high.

8. An apparatus according to claim 6, characterized in that the output of the NAND gate charges or discharges a capacitor via a resistor and a diode is connected between the capacitor and the positive voltage rail to clamp the voltage across the capacitor, whereby the capacitor, the resistor and the diode form a damping circuit for the output of the NAND gate.

9. An apparatus according to claim 8, characterized in that a second NAND gate is connected to the capacitor whereby the output of the NAND gate acts as an input to a third NAND gate, a capacitor and a resistor being connected to the output of the third NAND gate to form a high-pass filter.

10. An apparatus according to claim 9, characterized in that the capacitor and the resistor are chosen such that the output of the NAND gate must be high for 4 minutes before the voltage across the capacitor is sufficient to trigger the second NAND gate such that bright lights, such as those from passing vehicles, do not re-trigger the timing circuit.

11. An apparatus according to claim 5, characterized in that the timing circuit comprises an integrated timing circuit, a crystal, a diode, a resistor and a capacitor, the integrated timing circuit being connected to the resistor and receives the pulse signal therefrom and the crystal being connected to the integrated timing circuit to provide a stable frequency source.

12. An apparatus according to claim 11, characterized in that the integrated timing circuit is arranged to provide a pulse output for about 7 hours after being triggered.

* * * * *